(12) United States Patent
Harper et al.

(10) Patent No.: US 7,024,401 B2
(45) Date of Patent: Apr. 4, 2006

(54) PARTITION BOUNDARY DETERMINATION USING RANDOM SAMPLING ON VERY LARGE DATABASES

(75) Inventors: John William Harper, San Jose, CA (US); Gordon Robert Slishman, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 586 days.

(21) Appl. No.: 09/897,853

(22) Filed: Jul. 2, 2001

(65) Prior Publication Data

US 2003/0004944 A1 Jan. 2, 2003

(51) Int. Cl.
*G06F 17/30* (2006.01)

(52) U.S. Cl. .................... 707/2; 707/4; 707/7; 707/100

(58) Field of Classification Search .................. 707/2, 707/4, 7, 100, 1, 3, 200; 711/173
See application file for complete search history.

(56) References Cited

U.S. PATENT DOCUMENTS

| | | | |
|---|---|---|---|
| 5,179,699 A | | 1/1993 | Iyer et al. |
| 5,511,190 A | | 4/1996 | Sharma et al. |
| 5,675,786 A | * | 10/1997 | McKee et al. ................. 707/2 |
| 5,710,915 A | * | 1/1998 | McElhiney ..................... 707/2 |
| 5,970,495 A | | 10/1999 | Baru et al. |
| 6,049,861 A | | 4/2000 | Bird et al. |
| 6,092,085 A | | 7/2000 | Keene |
| 6,128,611 A | | 10/2000 | Doan et al. |
| 6,185,559 B1 | | 2/2001 | Brin et al. |
| 6,253,300 B1 | * | 6/2001 | Lawrence et al. .......... 711/173 |
| 6,542,886 B1 | * | 4/2003 | Chaudhuri et al. ............ 707/2 |

OTHER PUBLICATIONS

Thomas H. Cormen, Introduction to Algorithms 1990, p. 1, lines 17–19.*
Mark Allen Weiss, Algorithms, Data Structures, And Problem Solving with C++, 1996, lines 8–11.*
DFSMAID–, IMS V7 Migration Aid, Aug. 25, 2000, 4 pages.
IMS Version 7 High Availability Large Database Guide; ibm.com/Redbooks; Rick Long, et al.
IMS Primer; International Technical Support Organization; Rick Long, et al.
Introduction to Mathematical Statistics, by Hogg and Craig, $5^{th}$ ed., Random Sampling and Shuffling, p. 123.
HALDB and New Utilities, IMS; Published by Lotus Freelance Graphics.
Introduction to Algorithms; Thomas H. Cormen, et al. 3 pages.
Algorithms, Data Structures, and Problem Solving with C++; Chapter 5, Algorithm Analysis; Mark Allen Weiss, 3 pages.
"Introduction to Mathematical Statistics" by Hogg and Craig, 5th ed., p. 123.

* cited by examiner

*Primary Examiner*—Shahid Alam
*Assistant Examiner*—Cam Y Truong
(74) *Attorney, Agent, or Firm*—Fay, Sharpe, Fagan, Minnich & McKee, LLP

(57) ABSTRACT

A system and method utilizing random sampling for partition analysis on very large databases. The method utilizes a random sampling algorithm that provides results accurate to within a few percentage points for large homogeneous databases. The accuracy is not affected by the size of the database and is determined primarily by the size of the sample. The system and method for approximate partition analysis reduces the time required for an analysis to a fraction of the time required for an exact analysis. The reduction in time thereby permits more frequent and timely analyses of database partition sizes.

23 Claims, 3 Drawing Sheets

PARTITION BOUNDARY DETERMINATION USING RANDOM SAMPLING ON VERY LARGE DATABASES

CROSS-REFERENCE TO RELATED APPLICATION

This application is related to U.S. application Ser. No. 09/897,803, filed together with this application, entitled Random Sampling as a Built-in Function for Database Administration and Replication.

BACKGROUND OF THE INVENTION

The invention pertains to partition size analysis for very large databases having multiple partitions.

Information systems have become vitally important to modern businesses, and the growing reliance on information systems has made database design and management a critical task. Many databases have grown to such a large size that multiple partitions are required to accommodate them. As a result, and because of the dynamic nature of the shared data pool contained in large databases, partition size analysis is an important part of planning for future growth.

A problem arises, however, in the amount of time required for an analysis program to traverse a database and compile statistics relating to partition size. It would be beneficial to provide a method of partition size analysis that reduces the amount of time required to perform the analysis so that such analyses can be executed in a more timely basis without placing an undue burden on the computer system hosting the database. The ability to perform size analyses in a timely basis allows database managers to monitor growth patterns and to accurately estimate needs for database reorganization in terms of predicting the time of a required reorganization and projecting space allocation requirements.

Partition size analyses require only a sufficiently accurate approximate solution, as compared to the very precise solution obtainable by analyzing each and every item of data in a database. It is of little worth to provide a precisely accurate solution for a volatile database that is constantly changing including changing at the very moment that it is being analyzed. It is typically not possible to provide an exact analysis without first removing a database from online for an extended period of time. For size analyses, only a small portion of the full set of data must be processed to provide an accurate estimate of partition size, especially for very large homogeneous databases.

The present invention provides a method and system for performing database characterization and approximation analyses to generate very precise, as well as timely results. The method is based on first deriving a random sample of known size from a database of unknown size, or known size, and then extrapolating the results to provide an accurate approximation of a full-scale analysis.

The method and system provided are unique in that a random sample is selected of predetermined known size, but uniformly distributed across the entire database, from a database of known or unknown size while reading only a fraction of the records in the database without the requirement of indexing the entire database which, as indicated above, is time consuming and provides results having an unnecessary degree of precision. The sampling facility is provided s a built-in feature of the database management system and not simply attached to the DBMS as an associated external application. This enables earlier pruning and better performance because the sampling function is closer to the source database.

Other previous random sampling techniques, typically require that the database be indexed in order not to read the entire database, or read the entire database and randomly select samples from the entire result. As an example, U.S. Pat. No. 5,675,786, teaches a system that generates a sequential stream of initial results by first addressing a query to the database and then sampling the stream of initial results to produce a sampled result substantially smaller than the initial result.

In order to produce samples of predetermined size that are normally distributed across a database typically requires a knowledge of the exact number of records in the database beforehand. As an alternative to prior knowledge of the number of records, a complete scan of the database is performed prior to sampling is needed. For example, the '786 patent identified above requires that a particular sampling probability be selected in order to produce a particular sample size from a given result.

The present invention therefore provides a solution to the aforementioned problems, and offers other advantages over the prior art.

BRIEF SUMMARY OF THE INVENTION

In accordance with the present invention, a system and method for database partition boundary determination is provided. The method utilizes random sampling performed by a random sampling facility integral into a DBMS to sample a predetermined number of records from the database using a random sampling algorithm. Preferably, each time the method is utilized, different random number generator seed values are used so that different database records are selected for the random sampling. Further, the selected records are different for successive utilizations of the method when at least one record has been added to or deleted from the database between successive utilizations of the random sampling method.

Statistics are stored for each of the sampled records, including a record key for each record, and an approximation partition analysis is produced based on the stored statistics. The approximation partition analysis is not mathematically exact because of the sampling, however, the analysis is generally accurate to within a few percentage points which is adequate for dynamically changing databases where exactness would be rendered meaningless after a few transactions.

The preferred embodiment of the sampling method follows a mechanical procedure including the following steps:

1. A table of number pairs $(Y_j, I_j)$, j=1,2, . . . ,S, is generated where all Y and all I are initially set to zero, and S is the user-selected predetermined sample size.

2. A reservoir for storing records is set to an empty state.

3. Variable M, an index to the reservoir, is set equal to zero.

4. A sequence of N non-repeating random numbers $U_1, U_2, \ldots, U_N$, $0<U<1$, is generated as database records are considered for retrieval, where N is the initially unknown number of records in the database, and additional steps are performed for each random number $U_k$ generated including:

4.1 The next record in the database is skipped if $U_k$ is less than the smallest value of Y in the table of number pairs.

4.2 The table is updated if a Y less than $U_k$ exists as follows:

4.2.1 M is set equal to M+1.

4.2.2 The smallest Y in the table is replaced with $U_k$.

4.2.3 The I value paired with the smallest Y is set equal to M.

4.2.4 All or part of the next record of the database is stored in the reservoir where the current value of M is an index to the stored record.

4.2.5 The table is rearranged into a heap with respect to Y.

An alternate embodiment of the sampling method is provided for cases where the exact number of records in the database is known and database records can be read randomly by relative record number. The method is similar to the preferred method, however, reading and storing database records is deferred until a last step where a record is read for each (Y,I) in the table, and I is a relative record number for the record in the database. In the alternate embodiment, exactly S records are read, where more than S records, but less than N records, are read by the preferred embodiment.

Following the generation of an approximation partition analysis, multiple partition boundaries are defined that are sufficient to accommodate the database records and include spare space for future growth. All database records are accessed in an arbitrary sequence and the partitions are filled iteratively, except the last, with the accessed records to a maximum byte count, and the remaining accessed records are stored in the last partition.

Raw partition analysis, without random sampling analysis, places a heavy strain on a computer system in terms of memory usage and typically requires multiple dataspaces. Random sampling relieves the strain on the computer system in terms of processing and memory requirements. Much less memory is required to analyze 20,000 sampled records using the random sampling approach than to analyze 2,000,000,000 records without sampling. However, in order to maintain consistency with an unsampled approach which may be desirable under some circumstances, the preferred method using random sampling analysis utilizes one or more of each of the following types of dataspaces: index, key and statistics.

One benefit obtained from the present invention is the reduction in time required to perform an approximation partition analysis relative to the time required for an exact partition analysis.

Another benefit obtained from the present invention is that approximation partition analyses are performed frequently without straining or otherwise compromising computer system resources.

Still another benefit obtained from the present invention is an improved accuracy of the analyses, particularly for homogeneous database populations.

Yet another benefit obtained from the present invention is that a random sample of predetermined size is obtained without prior knowledge of the number of records in the sampled database.

Other benefits and advantages of the subject method and system will become apparent to those skilled in the art upon a reading and understanding of this specification.

BRIEF DESCRIPTION OF THE DRAWINGS

The invention may take physical form in certain parts and steps and arrangements of parts and steps, the preferred embodiments of which will be described in detail in the specification and illustrated in the accompanying drawings hereof and wherein.

DETAILED DESCRIPTION OF THE INVENTION

Databases have served the IS community very well since the 1960s. However, as the amount of information stored on these databases has grown over the years, and dependence on timely retrieval of information stored therein has increased, features and functions have been added to database management systems (DBMSs) to increase the capacity and availability of databases such as IBM's venerable DL/I and IMS databases.

The capacity of DL/I databases is limited by the maximum size of a data set that can be addressed by a four-byte relative byte address (RBA). Many other databases in use presently suffer from similar size limitations. In current full function databases, multiple data sets are supported. This helps to increase the capacity of the database. One requirement, however, is that all segments of the same type must be in the same data set. As a result, when one data set is full, the database is deemed to be essentially full even if empty space exists in the remaining data sets.

Figure 1:
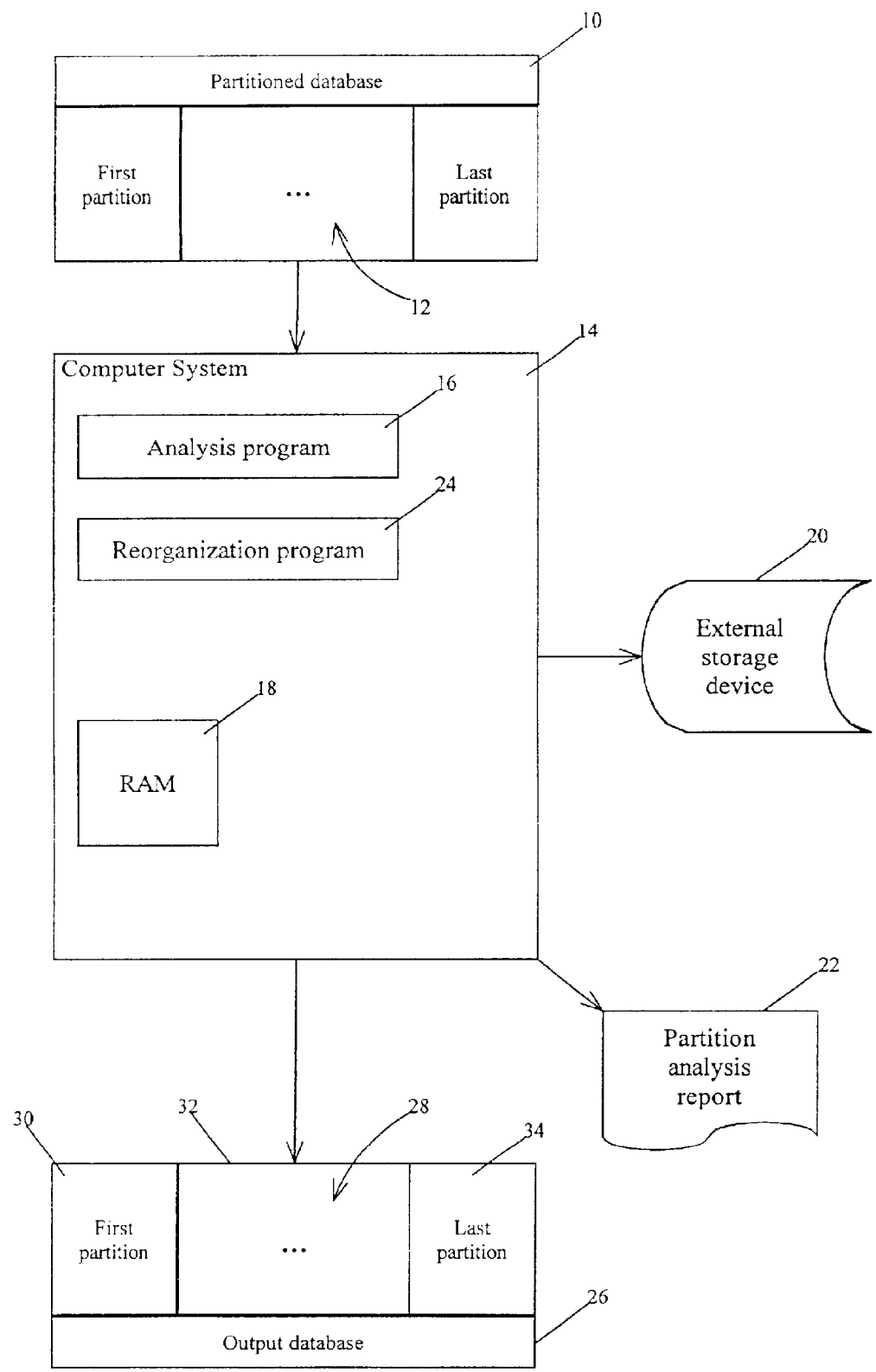
FIG. 1 is a generalized diagram of a computer system having a partitioned database.

As shown in FIG. 1, partitioning removes the data set limitation by relieving the restriction that all occurrences of the same segment type must be in the same data set. Partitioning database 10 groups database records into sets of partitions 12 that are treated as a single database by computer system 14, while permitting functions to be performed independently against individual partitions.

Partitions may be very large. More particularly, each partition has the same capacity limit as a non-partitioned database, in that no single data set may exceed the addressing limit. The ability to divide the database into multiple partitions provides the added advantage of decreasing the amount of data unavailable if a partition fails or is taken offline. For these reasons, partitioning has become a widely used and is well known means of extending the storage capacity of databases.

Correct initial sizing of a large partitioned database is important because after the database is in use, reorganization of the database is usually necessary to alter the size of the database, resulting in a potentially extended periods of database unavailability. For this reason, computer utility programs are used to statistically analyze existing databases while they are in use for growth trends and future storage capacity requirements.

A typical partition analysis program 16 stores compressed statistics in random access memory (RAM) 18, which may comprise real and virtual memory, or an external storage device 20 for every record in the database. Under certain conditions, the analysis program sorts those statistics by key in RAM, or on the storage device. Since a database may contain upward of a billion records, storing and sorting even compressed statistics involves numerically intensive computation, which may burden even large, powerful computers such as a mainframe. Sorting a large number of statistical records places a heavy load on the computer system because the time for sorting is typically proportional to $N_{rec}*\log_2(N_{rec})$ where $N_{rec}$ is the number of records being sorted and $\log_2$ is logarithm base 2. Even when sorting is not needed the analysis is time consuming because, as appreciated by those skilled in the art, nearly all elapsed time is spent in a get-next function to traverse the entire database.

By way of example, in the case of an IMS database which can contain up to 8 gigabytes (GB) in keys, on a computer system having RAM 18 dataspaces of up to $2^{31}$ bytes (2 GB), four dataspaces are required to store the keys. Another 2 GB are sufficient to store indices to the keys. However, the record statistics, even when compressed, may require dozens of dataspaces. To minimize the effort of storing and sorting, the present invention randomly samples a database and produces an extrapolated partition analysis 22 providing sufficiently accurate results. Preferably, the sample size selected is sufficiently small so that three dataspaces will suffice, one each for indices, keys, and statistics.

An analysis program 16, in communication with the DBMS 14, partitions a random sample size of S records, and then scales the tabulated numbers by the ratio of the number of records in the database to the number of records in the sample. For a homogeneous database, with records mostly of similar structure, the sampling is remarkably accurate. In one experiment used to test the accuracy of the sampling generally, 20,000 random integers were selected from a set of integers 1 to 2,147,483,646, the sample sorted, and the middle two averaged (sample[10000] and sample[10001]). Repeated 100 times, this experiment produced estimates all within 1.78% of the actual mean, 1,073,741,823.5.

In the present invention, an IMS database i.e. bisected by first sorting by key, and then bisecting at the median. A sample of size 20,000 normally produces a result within a percent or two of the exact result which would be obtained if the entire database was sampled. The present invention leverages the sampling strategy that in most cases it doesn't make sense to store and sort orders of magnitude more data for less than 2% improvement in accuracy, particularly when the database is not static. Perhaps counter-intuitively, larger databases do not require larger samples for similar accuracy. Accordingly, the present invention does not rely on large sample sizes for accuracy but rather is based on the theory of "order statistics" to perform random sampling of records. Although any suitable form of order statistics can be used, the complete mathematical description of the preferred order statistics used in the present invention is taught in "Introduction to Mathematical Statistics" by Hogg and Craig, $5^{th}$ ed., the teachings of which are incorporated herein by reference.

The scaling factor used to inflate the sample to the size of the full database is the number of records in the database (N) divided by the number of records in the sample (S), thus (N/S). Therefore, by definition, the root segment counts in the estimated partitions add up exactly to the total number of root segments in the database, while other estimates merely approximate corresponding database totals. Preferably, sampling stability is verified beforehand by experimenting with different sample sizes and random seeds, e.g. "sample= 10000, seed=7".

While random sampling can be of great benefit in reducing the number of records retrieved from database 10 for partition analysis, a large amount of time is spent in communicating requests from analysis program 16 to DBMS 14. For example, a call to DBMS 14 must be issued for each record to be skipped as well as for each record to be retrieved from database 10. Preferably, a built-in random sampling facility is provided as apart of the DBMS 14. In that way, only a single request from analysis program 16 is required to provide parametels to DBMS 14 for random sampling. The random sampling facility then performs all random sampling tasks on the database 10, and stores statistics from sampled records in RAM 18 or on external storage device 20 for use by analysis program 16.

An added benefit of providing the built-in sampling facility in accordance with the present invention, is that the random sampling facility, as an integral part of DBMS 14, has access to all low level I/O functions and I/O buffers. This enables rapid access to records being retrieved and a more efficient means for skipping records not selected for retrieval.

Typically, sampling requires selecting S items at random from a file. However, it is not normally known how many items are present in that file. One method is to count the records, then take a second pass to make the random selections. In accordance with the invention, however, M records (M≧S) of the original records are sampled on the first pass, where M is much less than N, so that only M items must be considered on the second pass. It is necessary to do this in such a way that the final result is a truly random sample of the original file.

Figure 2:
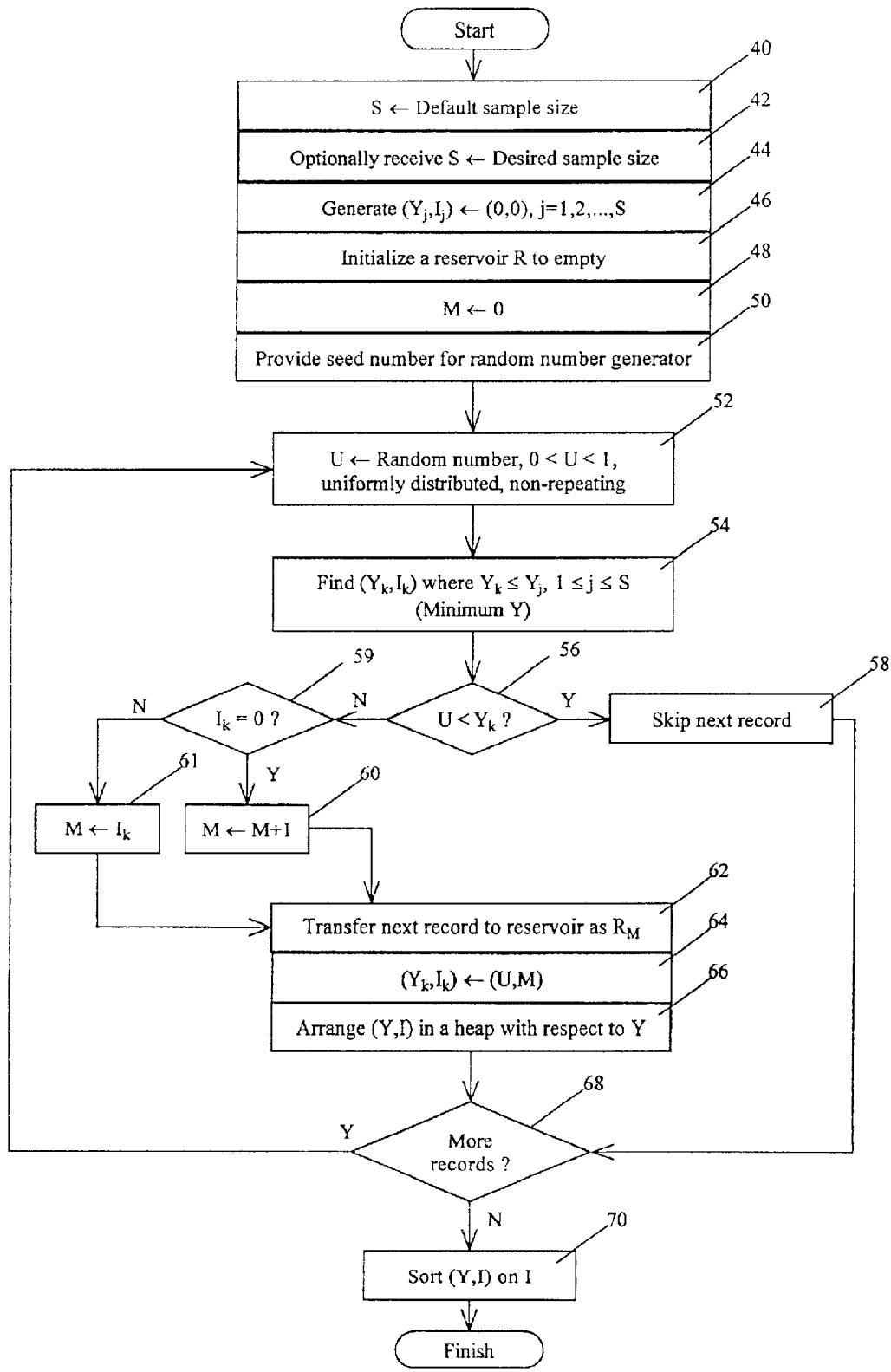
FIG. 2 is a flowchart illustrating the preferred method of performing partition boundary determination using random sampling on very large databases; and, FIG. 3 is a flowchart of an alternate embodiment of partition boundary determination using random sampling on very large databases.

With reference now to FIG. 2, and with continuing reference to FIG. 1, a preferred algorithm is presented that provides a method of random sampling according to the aforementioned conditions. This algorithm is implemented in analysis program 16 and the results of the analysis program can then be used by reorganization program 24 to reorganize input database 10 by reading records from partitions 12 and writing the same records to an output database 26 comprising partitions 28, including first partition 30, intermediate partitions 32 and last partition 34.

The overall strategy incorporated in the random sampling facility preferably uses the technique of order statistics. N random values are computed, and then the largest S of these is ascertained. The corresponding S records are selected for the final sample. During the first pass, a reservoir is constructed which contains only those M records which are possible candidates, i.e., those records which correspond to a random value that has not been preceded by S larger values. The first S items are always placed into the reservoir.

The sampling algorithm first performs several initialization functions. In a first step 40, variable S is initially set to a pre-configured default sample size. A particular desired sample size is selectively received to replace the initial value of S at step 42. A table of paired numbers $(Y_j, I_j)$ is generated and initialized such that $(Y_j, I_j) = (0,0)$, $j=1,2,\ldots,$ S at step 44. A reservoir R, for storing compressed statistics from selected database records, is initialized to an empty state at step 46. The variable M which represents the number of possible candidates is zeroed at step 48, and a random number generator seed value is provided at step 50.

Once initialization has been completed according to the invention, an iterative loop is processed to perform the random sampling function. A random number U is generated from a random number generator capable of generating N uniformly distributed, non-repeating random numbers at step 52. (At a set of variables $(Y_k, I_k)$ is found such that $Y_k \leq Y_j$, $1 \leq j \leq N$ or, in other words, $Y_k$ is a minimum Y at step 54. Next, the random number U is compared to $Y_k$ at step 56. A comparison "if $U<Y_k$" is made, and if true, then the next available record in the database is skipped at step 58 otherwise the variable $I_k$ is tested at step 59 to determine if the minimum Y found at step 54 is residue from the reservoir initialization process. This indicates that the reservoir is not yet full. If it is determined at step 59 that the reservoir is not yet full, the variable M is incremented M←M+1 at step 60 and the next available record in the database, or portions of it, are stored in reservoir R where M is an index, symbolically $R_M$ at step 62, $(Y_k, I_k) \leftarrow (U, M)$ at step 64; and the table of paired numbers (Y,I) is rearranged to form a heap (defined below) with respect to Y at step 66.

A test is performed to determine if more records exist in the database at step 68, and if more records exist, processing returns to the top of the iterative loop, otherwise processing continues to the next step.

After the reservoir is full, the minimum Y value found at step 54 will not be a value remaining from the initialization step 44, but will be a non-zero value originating from the random number U assigned previously at step 64. This is tested at step 59 whereupon the value of $I_k$ is assigned to the variable M at step 61. It can be seen that the variable M increases by integer increments until the reservoir becomes full. Thereafter, the increment step 60 is bypassed whereupon the indexes M are revised or reassigned to the reservoir entries. As a final step, the table of number pairs (Y,I) can now be sorted on I to place the table in order by record at step 70.

For purposes of the description of the preferred embodiment of the invention, the aforementioned heap is defined as follows:

S elements (Y,I) are a heap with respect to Y if and only if $Y_j < Y_{2j}$ and $Y_j < Y_{2j+}$ for all $j \leq S/2$.

Maintaining the table in a heap, so that the smallest element is always on top, facilitates testing each random number against the smallest number in the table. Each time a random tag is found that is larger than the smallest Y in the table, the smallest element is replaced, and the table is reformed into a heap.

Figure 3:
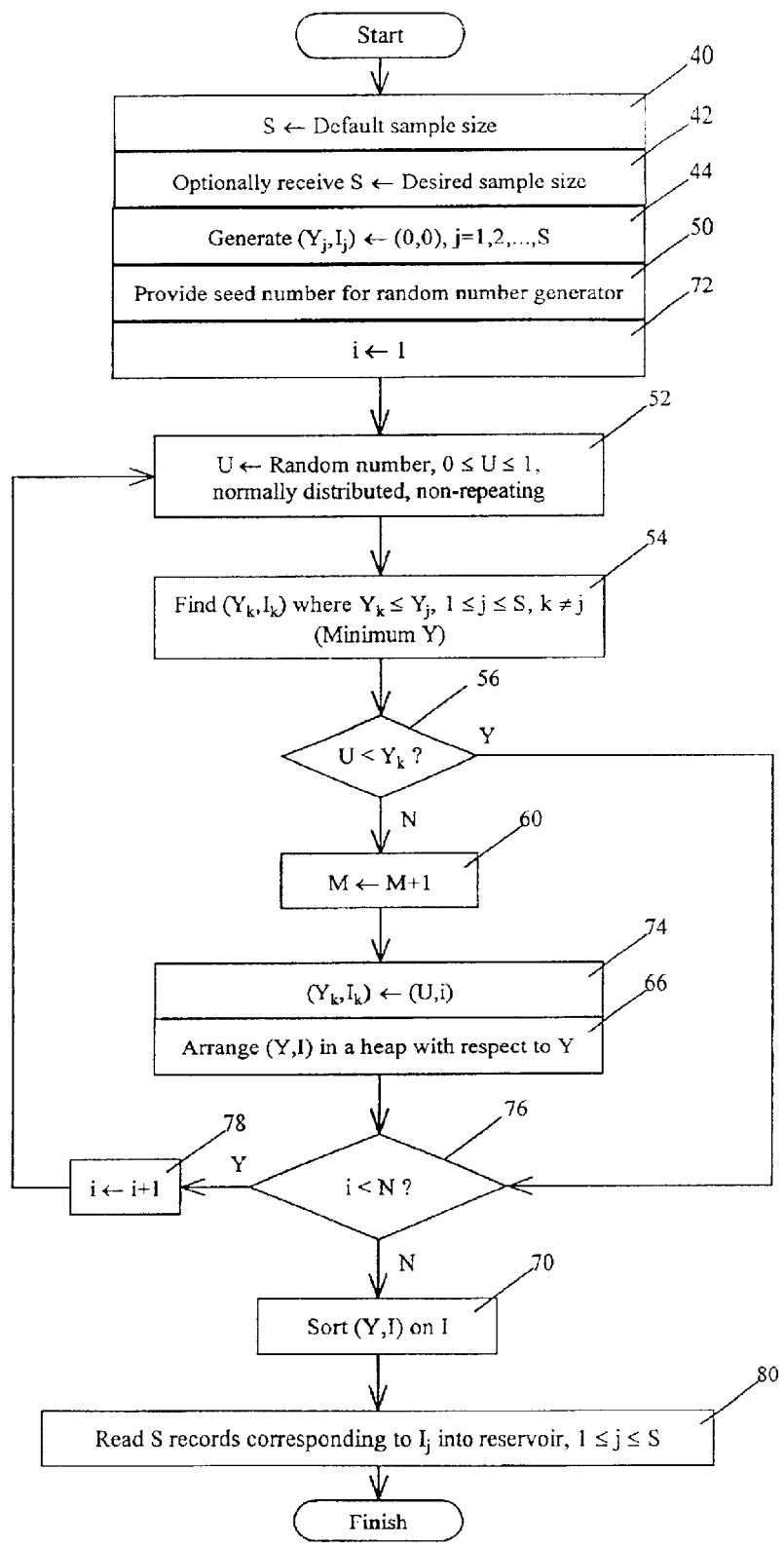

The method illustrated in FIG. 2 is preferred for cases where the number of records in the database is not exactly known, however, when the number of records is known in advance, and database records can be retrieved by a relative reference index, the algorithm can be streamlined somewhat to reduce the number of records read from the database. FIG. 3, with continuing reference to FIG. 2, shows an alternate algorithm for the case where N is known. Like numbered numerals in FIG. 3 refer to like numbered steps in FIG. 2.

The alternate sampling algorithm first performs several initialization functions:

variable S is initially set to a pre-configured default sample size (step 40);

a particular desired sample size is selectively received to replace the initial value of S (step 42);

a table of paired numbers $(Y_j, I_j)$ is generated and initialized such that $(Y_j, I_j) = (0,0)$, $j = 1, 2, \ldots, S$ (step 44);

a random number generator seed value is provided (step 50); and, an index variable i is initialized, i←1 (step 72).

After initialization has been completed, an iterative loop is processed to perform the random sampling function:

U←random number from a random number generator capable of generating N normally distributed, non-repeating random numbers (step 52);

$(Y_k, I_k)$ is found such that $Y_k \leq Y_j$, $1 \leq j \leq N$ or, in other words, $Y_k$ is a minimum Y (step 54);

U is compared to $Y_k$ (step 56);

if $U < Y_k$ then:

U is ignored;

else:

$(Y_k, I_k) \leftarrow (U, i)$ (step 74);

the table of paired numbers (Y,I) is rearranged to form a heap (defined below) with respect to Y (step 66);

a test is performed to determine if i<n (step 76) in which case processing returns to the top of the iterative loop, otherwise processing continues to the next step;

the table of number pairs (Y,I) can now be sorted on I to place the table in order by record (step 70); and, S records are now read from the database and stored in a reservoir, wherein $I_j$ comprises an index to each record on the database, $1 \leq j \leq S$.

It should be realized that the memory required by a partition analysis, even when random sampling is employed can be large and, consequently, multiple dataspaces may be required. For databases organized with indexes and keys, sampling may require one or more dataspaces, e.g. one or more index dataspaces, one or more key dataspaces, and one or more statistics dataspaces.

After random sampling has been performed by either sampling method, and analysis program 16 has performed necessary partition analyses, the reorganization program 24 next defines the output partitions, accesses all database records in an arbitrary sequence and iteratively fills all of the partitions, except the last, to their maximum byte count. The last partition is preferably filled to less than its maximum byte count. The partitions are optionally sized somewhat larger than the calculated maximum byte count to allow for growth within each partition as desired.

The invention has been described with reference to the preferred embodiments. Potential modifications and alterations will occur to others upon a reading and understanding of the specification. It is our intention to include all such modifications and alterations insofar as they come within the scope of the appended claims, or the equivalents thereof.

Having thus described our invention, we now claim:

1. A method for database partition boundary determination in a database management system (DBMS), the method comprising:

providing a pre-configured number S defining a default sample size in a database analysis program;

selectively receiving by the database analysis program a particular number defining a desired sample size and setting said number S equal to said particular number;

providing a seed value to the database analysis program for initializing a random number algorithm;

randomly sampling S records of the database by the database analysis program using the random sampling algorithm, wherein said S records are different each time said method is utilized with different seed values, and wherein said S records are different for successive utilizations of said method if at least one record has been added to or deleted from said database between successive utilizations of said method;

storing statistics for each of said S records as stored statistics including a record key for each record; and, producing an approximation partition analysis based on said stored statistics, wherein said approximation partition analysis is not mathematically exact.

2. The method as set forth in claim 1, further comprising sorting said stored statistics by key prior to producing said partition analysis.

3. The method as set forth in claim 1, wherein said storing said statistics includes storing said statistics in a memory.

4. The method as set forth in claim 3, wherein said storing said statistics in said memory includes compressing the statistics prior to storing in said memory.

5. The method as set forth in claim 3, further including sorting said stored statistics by key prior to producing said partition analysis.

6. The method as set forth in claim 5, wherein said producing said approximation partition analysis includes defining multiple partition boundaries.

7. The method as set forth in claim 6, further including:

accessing all database records in an arbitrary sequence;

iteratively filling all of said partitions except the last with said accessed records to a maximum byte count; and, storing remaining accessed records in the last of said partitions.

8. The method as set forth in claim 1, wherein said randomly sampling said S records includes randomly sampling the S records utilizing dataspaces including:
   at least one index dataspace;
   at least one key dataspace; and,
   at least one statistics dataspace.

9. A method for database partition boundary determination comprising:
   providing a pre-configured number S defining a default sample size;
   selectively receiving by the database analysis program a particular number defining a desired sample size and setting said number S equal to said particular number;
   providing a seed value for initializing a random number algorithm;
   randomly sampling S records of the database using the random sampling algorithm, wherein said S records are different each time said method is utilized with different seed values, and wherein said S records are different for successive utilizations of said method if at least one record has been added to or deleted from said database between successive utilizations of said method, wherein said randomly sampling S records further includes:
      generating a table of S number pairs $(Y_j, I_j)$, j=1,2, . . . ,S, wherein all Y and all I are initially set to zero;
      initializing a reservoir of records to an empty state;
      setting an index M to said reservoir equal to zero;
      generating a sequence of N non-repeating random numbers $U_1, U_2, \ldots, U_N$, $0 \leq U \leq 1$, wherein N is the number of records in the database;
      performing additional steps for each random number $U_k$ generated, k=1,2, . . . ,N, including:
         skipping the next record in the database if $U_k$ is less than the smallest value of Y in said table of number pairs; and,
         updating the table if a Y less than $U_k$ exists by performing further steps including:
            setting M equal to its current value plus one;
            replacing the smallest Y in the table with $U_k$;
            setting the I value paired with the smallest Y equal to M; and,
            storing all or part of the next record of the database in said reservoir of stored records, wherein the current value of M is a reservoir index to said stored record;
      storing statistics for each of said S records as stored statistics including a record key for each record; and,
   producing an approximation partition analysis based on said stored statistics, wherein said approximation partition analysis is not mathematically exact.

10. The method as set forth in claim 9, wherein said updating the table further includes arranging the table in a heap with respect to Y.

11. A method for database partition boundary determination comprising:
   providing a pre-configured number S defining a default sample size;
   selectively receiving by the database analysis program a particular number defining a desired sample size and setting said number S equal to said particular number;
   providing a seed value for initializing a random number algorithm;
   randomly sampling S records of the database using the random sampling algorithm, wherein said S records are different each time said method is utilized with different seed values, and wherein said S records are different for successive utilizations of said method if at least one record has been added to or deleted from said database between successive utilizations of said method, wherein said randomly sampling S records further comprises:
      generating a table of S number pairs $(Y_j, I_j)$, j=1,2, . . . ,S, wherein all Y and all I are initially set to zero;
      generating a sequence of N non-repeating random numbers $U_1, U_2, \ldots, U_N$, $0 \leq U \leq 1$, wherein N is the number of records in the database; and,
      performing additional steps for each random number $U_i$ generated, i=1,2, . . . ,N, including:
         ignoring $u_i$ if $U_i$ is less than the smallest value of Y in said table of number pairs; and,
         updating the table if a Y less than $U_i$ exists by performing further steps including:
            replacing the smallest Y in the table with $U_i$;
            setting the I value paired with the smallest Y equal to i; and,
            reading S records from the database corresponding to $I_j$, j=1,2, . . . ,S, wherein $I_j$ is an index to a record in the database
      storing statistics for each of said S records as stored statistics including a record key for each record; and,
      producing an approximation partition analysis based on said stored statistics, wherein said approximation partition analysis is not mathematically exact.

12. The method as set forth in claim 11, wherein said updating the table further includes arranging the table in a heap with respect to Y.

13. A database partition boundary determination system comprising:
   a first computer program routine having a random number generating algorithm;
   a second computer program routine having a random sampling facility utilizing said first program routine to randomly read records from a database and store statistics for each read record including a record key, wherein said read records are different each time said second routine is utilized with different seed values, and wherein said read records are different for successive utilizations of said second routine if at least one record has been added to or deleted from said database between successive utilizations of said second routine; and,
   a third computer program routine for generating a partition boundary analysis based on said stored statistics, wherein said partition boundary analysis is an approximation and is not mathematically exact.

14. The system of claim 13, further comprising a fourth computer program routine for sorting said stored statistics by key prior to producing said partition analysis.

15. The system of claim 13, further including a memory for storing said statistics.

16. The system of claim 15, further comprising a fourth computer program routine for sorting said stored statistics by key prior to producing said partition analysis.

17. The system of claim 16, wherein said partition analysis includes means for performing an analysis of multiple partition boundaries.

18. The system of claim 13, further comprising:
   means for accessing all database records in an arbitrary sequence;
   means for iteratively filling all of said partitions except the last with said accessed records to a maximum byte count; and, means for storing remaining accessed records in the last of said partitions.

19. The system of claim 13, further comprising:

means for utilizing at least one index dataspace;

means for utilizing at least one key dataspace; and, means for utilizing at least one statistics dataspace.

20. A database partition boundary determination system comprising:

a first computer program routine having a random number generating algorithm;

a second computer program routine having a random sampling facility utilizing said first program routine to randomly read records from a database and store statistics for each read record including a record key, wherein said read records are different each time said second routine is utilized with different seed values, and wherein said read records are different for successive utilizations of said second routine if at least one record has been added to or deleted from said database between successive utilizations of said second routine, wherein said random sampling facility further comprises:

means for generating a table of S number pairs ($Y_j$, $I_j$), j=1,2, . . . ,S, wherein all Y and all I are initially zero;

means for initializing a reservoir of records to an empty state;

means for setting an index M to said reservoir equal to zero;

means for generating a sequence of N non-repeating random numbers $U_1, U_2, \ldots, U_N$, $0 \leq U \leq 1$, wherein N is the number of records in the database; and, means, for each random number $U_k$ generated, k=1, 2, . . . ,N, comprising:

means to skip the next record in said database if $U_k$ is less than the smallest value of Y in said table of number pairs; and, means to update the table if a Y less than $U_k$ exists, comprising: a means to set M equal to its current value plus one;

means to replace the smallest Y in the table with $U_k$;

means to set the I value paired with the smallest Y equal to M; and, means to store all or part of the next record of said database in said reservoir of stored records, wherein the current value of M is a reservoir index to said stored record; and, a third computer program routine for generating a partition boundary analysis based on said stored statistics, wherein said partition boundary analysis is an approximation and is not mathematically exact.

21. The system of claim 20 wherein the means to update the table further comprises means to arrange the table in a heap with respect to Y.

22. A database partition boundary determination system comprising:

a first computer program routine having a random number generating algorithm;

a second computer program routine having a random sampling facility utilizing said first program routine to randomly read records from a database and store statistics for each read record including a record key, wherein said read records are different each time said second routine is utilized with different seed values, and wherein said read records are different for successive utilizations of said second routine if at least one record has been added to or deleted from said database between successive utilizations of said second routine, wherein said random sampling facility further comprises:

means for generating a table of S number pairs ($Y_j$, $I_j$), j=1,2, . . . ,S, wherein all V and all I are initially zero;

means for generating a sequence of N non-repeating random numbers $U_1, U_2, \ldots, U_N$, $0 \leq U \leq 1$, wherein N is the number of records in the database;

means, for each random number $U_i$ generated, i=1,2, . . . ,N, comprising:

means to ignore $u_i$ if $U_i$ is less than the smallest value of Y in said table of number pairs; and, means to update the table if a Y less than $U_i$ exists, comprising:

means to replace the smallest Y in the table with $U_i$;

means to set the I value paired with the smallest Y equal to i; and, means for reading S records from the database corresponding to $I_j$, j=1,2, . . . ,S, wherein $I_j$ is an index to a record in the database; and, a third computer program routine for generating a partition boundary analysis based on said stored statistics, wherein said partition boundary analysis is an approximation and is not mathematically exact.

23. The system of claim 22 wherein the means to update the table further comprises a means to arrange the table in a heap with respect to Y.

* * * * *